United States Patent  [11] 3,604,054

| [72] | Inventors | Karl-Heinz Eisenmann<br>Bergisch Neukirchen;<br>Ferdinand Proksa, Bergisch Neukirchen;<br>Willi Schmitzer, Birlinghoven, all of,<br>Germany |
|---|---|---|
| [21] | Appl. No. | 880,004 |
| [22] | Filed | Nov. 26, 1969 |
| [45] | Patented | Sept. 14, 1971 |
| [73] | Assignees | Farbenfabriken Bayer Aktiengesellschaft<br>Leverkusen, ;<br>Maschinenfabrik Hennecke GmbH<br>Leverkusen, Germany |
| [32] | Priority | Dec. 23, 1968 |
| [33] |  | Germany |
| [31] |  | P 18 16 549.6 |

[54] APPARATUS FOR MAKING SHAPED FOAM ARTICLES
7 Claims, 3 Drawing Figs.

| [52] | U.S. Cl. | 18/4 B, 18/5 P, 264/47 |
|---|---|---|
| [51] | Int. Cl. | B29d 9/00, B29d 27/04, B29c 5/00 |
| [50] | Field of Search | 18/4 B, 4 S, 5 A, 5 F, 5 P, 19 TM, 19 TC, 6 C; 264/47, 54, 45 |

[56] References Cited
UNITED STATES PATENTS

| 775,542 | 11/1904 | McConnell | 18/5 A |
|---|---|---|---|
| 2,874,407 | 2/1959 | Chabot et al. | 18/4 B |
| 2,898,634 | 8/1959 | Alderfer | 264/47 |
| 3,048,888 | 8/1962 | Schockley et al. | 18/5 A |
| 3,050,776 | 8/1962 | Kopper | 18/4 B X |
| 3,163,687 | 12/1964 | Einhorn | 264/54 |
| 3,216,849 | 11/1965 | Jacobs | 264/54 X |
| 3,429,956 | 2/1969 | Porter | 18/4 B X |
| 3,496,596 | 2/1970 | Buff | 18/4 B |

*Primary Examiner*—J. Spencer Overholser
*Assistant Examiner*—R. L. Spicer, Jr.
*Attorney*—Burgess, Dinklage & Sprung ABSTRACT: For the production of foamed rods an endless conveyor belt is used which carries the underpart of the foaming mold, while the upper part of the foaming mold is rigidly fixed above the conveyor belt.

INVENTORS:

KARL HEINZ EISENMANN, FERDINAND PROKSA, WILLI SCHMITZLER.
BY

APPARATUS FOR MAKING SHAPED FOAM ARTICLES

BACKGROUND

This invention relates to an apparatus for making shaped foam articles, particularly of round cross section, from polyurethane. This apparatus consists of a feed for the raw material and a conveyor consisting of a continuously revolving belt which carries a foaming mould which comprises a top half and bottom half. An apparatus of this kind is desirable for the continuous production of shaped foam articles.

In one known apparatus, two side belts are arranged over a bottom belt. These two side belts carry the mould sections which are used to make the shaped foam product. The disadvantage of this apparatus is the need to provide three different belts which cooperate with one another. Since the side belts have to be supported from above because of the revolving bottom belt, the entire structure is extremely complicated and accordingly tends to produce vibration and breakdowns.

It is also known that tubular foam sections can be produced by distributing a foamable mixture over a supporting film, folding the coated supporting film by means of a folding attachment and then guiding it through a tubular sleeve which acts as the foaming mould. The disadvantage of this apparatus is that the expansion of the mixture in the mould sleeve sometimes generates such a large pressure that considerable friction is developed between the outer surface of the supporting film and the sleevelike mould. Accordingly, it is necessary to provide special takeoff rollers which are liable to deform the shaped article just after it has finished expanding.

In another known process (cf. U.S. Pat. No. 2,898,634) a foamable mixture is distributed over a supporting film whose edges are then placed flat one on top of the other and joined to form an enclosed space before the mixture begins to expand. In this case, the supporting film actually represents the mould itself. Since the film is readily distorted, it may bulge out to differing degrees with the result that it is impossible to produce a shape of constant diameter. Apart from this, there is the danger that the natural weight of the foam will produce an elliptical or oval article rather than a circular or disclike shape.

The object of the invention is to provide an apparatus by means of which it is possible to make shapes of uniform cross section with very little outlay in terms of machinery.

According to the invention, this object is achieved by rigidly mounting the top half of the mould, while the bottom half of the mould is arranged on the revolving belt as known per se and has individual sections. It is possible in this way to obtain an arrangement which requires only very simple machinery, which nevertheless enables the foamed shape to be supported over the entire effective length of the conveyor by means of the bottom half of the mould which consists of individual sections as known per se. Moreover, the rigid arrangement of the top half of the mould enables the drive system to be greatly simplified. The transporting effect which the bottom half of the mould has on the shape which is in the process of foaming overcomes the friction developed by the fixed top half of the mould without producing any disadvantages.

THE INVENTION

In summary, the invention provides apparatus suitable for continuous moulding of elongated shaped elements of foamed plastic, comprising only one band, endless conveyor having an upper flight and a lower flight. A stationary mould member is mounted over the upper flight and forms the upper portion of the mould. A moving mould member is composed of moving mould member elements which are mounted on the outwardly disposed side of the conveyor band. The moving mould elements are in abutting relation as they travel over the upper flight, thereby providing the moving mould member as a continuous lower portion of the mould disposed on the upper flight of the conveyor.

Means can be provided for supplying a supporting film to the inlet end of the mould to line the mould and envelope the foaming material. Further, means are provided for depositing material for foaming on the foil adjacent the inlet end of the mould.

In one particular embodiment of the invention, the top half of the mould is provided with perforations. The object of this perforation is to enable the gases liberated during expansion of the foam to escape from the mould. In an alternative embodiment which may also be combined with the embodiment just described, the top half of the mould consists of two symmetrically arranged shells between which a gap is left as a vent. In this case, the air escapes preferentially through the vent gap. For this reason, the foil which is used as a cover which preferably consists of paper, should, of course, be permeable to gases or alternatively the gases escape through the gap left by the foil in the upper part.

Preferably, the lower edges of the top half of the mould and the upper edges of the bottom half of the mould should be in the form of a cooperating sliding seal to prevent the foam from escaping out at the sides. In another particular embodiment, the inlet end of the top half of the mould is rounded off. This has the advantage, particularly when producing round shapes, that the folded supporting film is actually introduced into the mould proper.

Preferably, the mould sections are designed so as to be replaceable so that the apparatus can be used for the manufacture of different kinds of shapes. In some cases, it is sometimes sufficient to arrange additional mould sections within the mould sections of the so-called basic mould to enable the arrangement to be used for different shapes.

Naturally the apparatus may also be used for working in strengthening shapes or even for the production of pipes or insulating shells by fitting it with the appropriate attachments. In this case, the apparatus has to be equipped with a means for feeding an inner tube or pipe to be foamed around its walls or alternatively it has to be provided with a mandrel extending to the end of the foaming zone which keeps the internal cross section of the pipe free during foaming.

One embodiment of the apparatus according to the invention is diagrammatically illustrated by way of example in the accompanying drawing, wherein.

Figure 1:
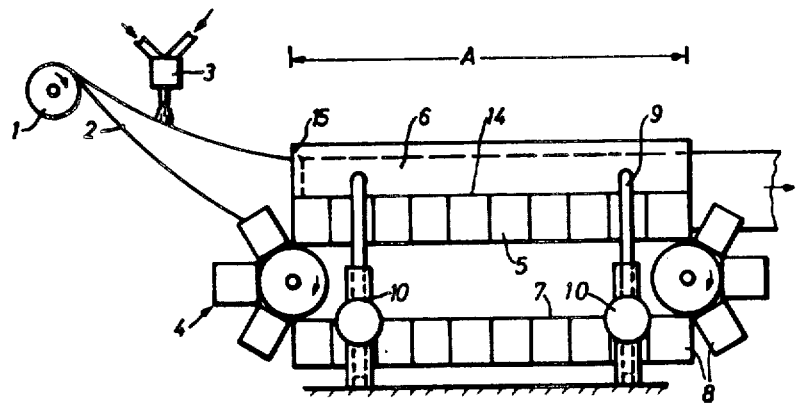
FIG. 1 is a side elevation of the apparatus.
Figure 2:
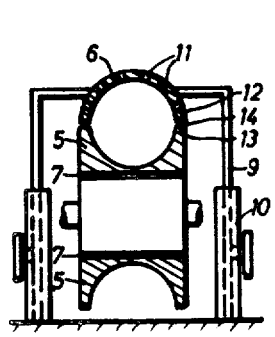
FIG. 2 is a cross section through the apparatus shown in FIG. 1; sn.

As shown in FIGS. 1 and 2, a supporting film 2 is unwound from a supply roller 1. An expandable liquid mixture is applied to this supporting film by means of a raw material feed 3 in the form of a nozzle equipped mixer head. The supporting film then passes into the conveyor 4 consisting of a bottom half of the mould 5 and a top half of the mould 6. The bottom half of the mould 5 is in the form of an endless revolving belt 7 provided with individual mould sections 8. The mould sections 8 are detachably fixed to the actual conveyor belt 5. The top half 6 of the mould is kept rigid by means of a frame 9 and is in the form of a half shell. The frame 9 is provided with a vertical adjustment 10 which enables the top half 6 of the mould to be lifted off the bottom half 5 of the mould. The top mould half 6 is provided with perforations 11 to enable the gases formed during the reaction to escape. The lower edge 12 of the top mould half 6 and the upper edge 13 of the bottom mould half 5 together form a sliding seal 14. The edges are readily machined smooth to achieve this. The inlet end of the top mould half 6 is rounded at 15 to enable the supporting film 2 to pass smoothly into the mould section A.

Figure 3:
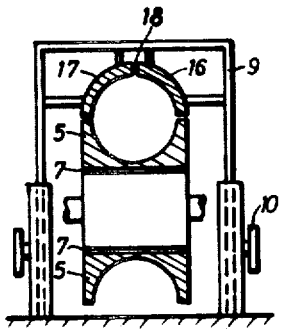
FIG. 3 is a cross section through an apparatus with a specially designed top half of the mould.

FIG. 3 shows an apparatus similar to that shown in FIGS. 1 and 2, except that instead of the top half 6 of the mould consisting of a half shell, there are two symmetrically arranged mould shells 16 and 17 with a gap 18 left between them as a vent.

We claim:

1. Apparatus suitable for continuous moulding of elongated shaped elements of foamed plastic comprising:
   a. only one band, endless conveyor having an upper flight and a lower flight,
   b. a stationary mould member mounted over the upper flight and forming the upper portion of the mould,
   c. a moving mould member composed of moving mould member elements mounted on the outwardly disposed side of the conveyor band, said moving mould elements being in abutting relation as they travel over said upper flight providing the moving mould member as a continuous lower portion of the mould disposed on the upper flight of the conveyor.

2. Apparatus as claimed in claim 1, and means for supplying a supporting film to the inlet end of the mould to line the mould and envelope the foaming material, and means for depositing material for foaming on the foil adjacent the inlet end of the mould.

3. Apparatus as claimed in claim 1, wherein the stationary mould member is provided with perforations.

4. Apparatus as claimed in claim 1, wherein the stationary mould member comprises two stationary mould elements the adjacent portions thereof along the uppermost part of the stationary mould member, being spaced, providing a vent for the mould.

5. Apparatus as claimed in claim 1, wherein the stationary and moving mould members are in sliding surface contact whereby a seal is provided between the stationary and moving mould members.

6. Apparatus as claimed in claim 2, wherein the inlet end of the stationary mould member is rounded off to facilitate entry of the supporting film into the mould.

7. Apparatus as claimed in claim 1, wherein the mould members are removably mounted on the apparatus.